(12) United States Patent
Ogata

(10) Patent No.: US 12,725,370 B2
(45) Date of Patent: Sep. 1, 2026

(54) INFORMATION PROCESSING APPARATUS FOR WARNING USER OF COLLISION WITH PHYSICAL OBJECT IN CROSS REALITY (XR) EXPERIENCE, INFORMATION PROCESSING METHOD, AND STORAGE MEDIUM

(71) Applicant: CANON KABUSHIKI KAISHA, Tokyo (JP)

(72) Inventor: Naoko Ogata, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 118 days.

(21) Appl. No.: 18/612,965

(22) Filed: Mar. 21, 2024

(65) Prior Publication Data

US 2024/0320934 A1 Sep. 26, 2024

(30) Foreign Application Priority Data

Mar. 24, 2023 (JP) ................................ 2023-047806

(51) Int. Cl.
*G06T 19/00* (2011.01)
*G06F 3/01* (2006.01)

(52) U.S. Cl.
CPC ............ *G06T 19/006* (2013.01); *G06F 3/013* (2013.01)

(58) Field of Classification Search
None
See application file for complete search history.

(56) References Cited

U.S. PATENT DOCUMENTS

| | | | | |
|---|---|---|---|---|
| 10,948,724 | B2 | 3/2021 | Fujimaki | |
| 11,391,944 | B2 | 7/2022 | Kawano | |
| 11,474,610 | B2 | 10/2022 | Lee | |
| 2021/0349309 | A1* | 11/2021 | Kawano | G06F 3/011 |

FOREIGN PATENT DOCUMENTS

| | | |
|---|---|---|
| JP | 2012155654 A | 8/2012 |
| JP | 2017156887 A | 9/2017 |

* cited by examiner

*Primary Examiner* — Nicholas R Wilson
(74) *Attorney, Agent, or Firm* — Canon U.S.A., Inc., IP Division

(57) ABSTRACT

An information processing apparatus includes at least one processor, and a memory coupled to the at least one processor and storing instructions that, when executed by the processor, cause the processor to function as a first acquisition unit configured to acquire information about a position and an orientation of a display apparatus, a second acquisition unit configured to acquire information about a position of a physical object, and a warning unit configured to change a warning method to warn a user depending on whether the physical object is present in a line-of-sight direction of the user.

20 Claims, 9 Drawing Sheets

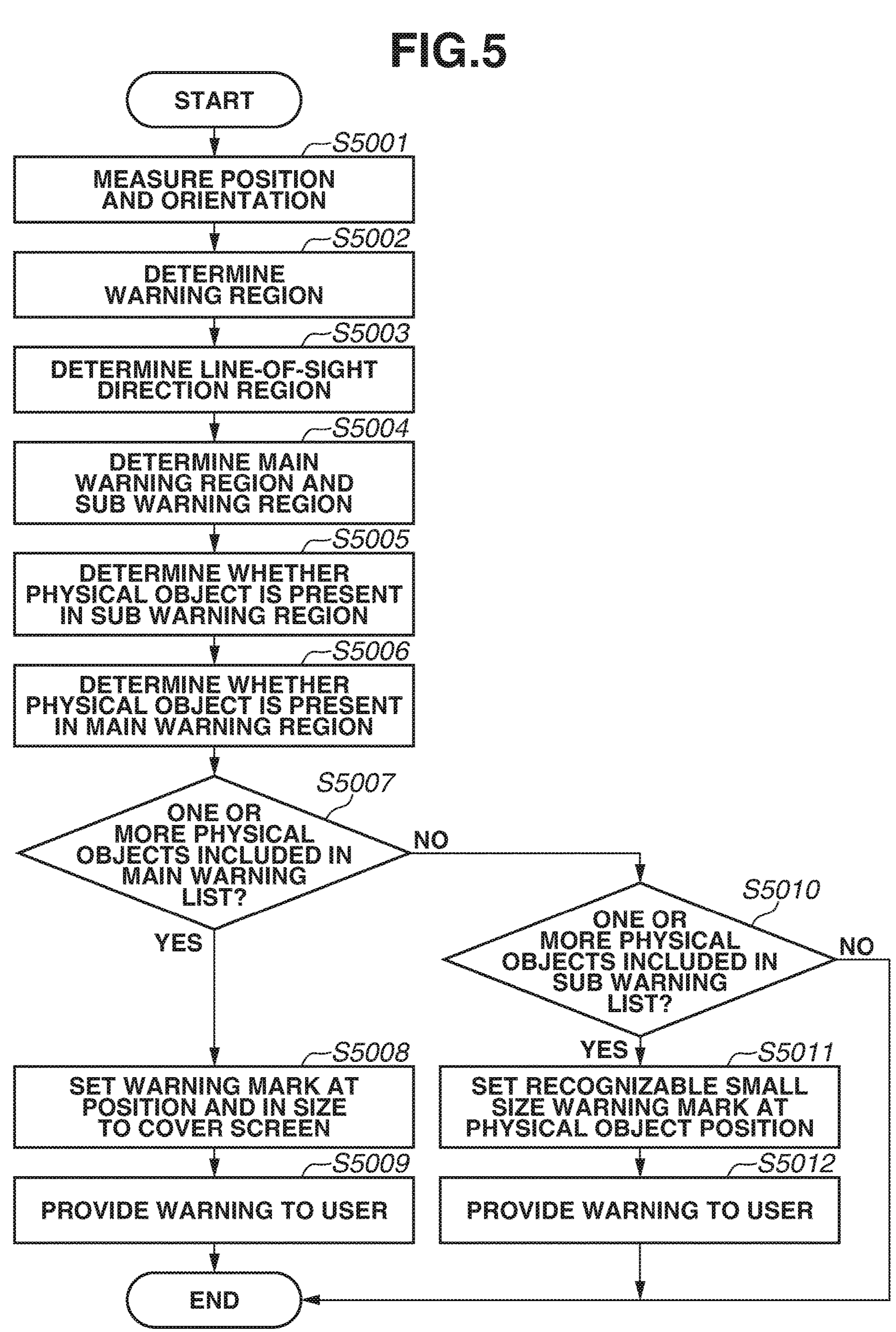
FIG.5
START
S5001
MEASURE POSITION AND ORIENTATION
S5002
DETERMINE WARNING REGION
S5003
DETERMINE LINE-OF-SIGHT DIRECTION REGION
S5004
DETERMINE MAIN WARNING REGION AND SUB WARNING REGION
S5005
DETERMINE WHETHER PHYSICAL OBJECT IS PRESENT IN SUB WARNING REGION
S5006
DETERMINE WHETHER PHYSICAL OBJECT IS PRESENT IN MAIN WARNING REGION
S5007
ONE OR MORE PHYSICAL OBJECTS INCLUDED IN MAIN WARNING LIST?
NO
YES
S5010
ONE OR MORE PHYSICAL OBJECTS INCLUDED IN SUB WARNING LIST?
NO
YES
S5008
SET WARNING MARK AT POSITION AND IN SIZE TO COVER SCREEN
S5011
SET RECOGNIZABLE SMALL SIZE WARNING MARK AT PHYSICAL OBJECT POSITION
S5009
PROVIDE WARNING TO USER
S5012
PROVIDE WARNING TO USER
END

INFORMATION PROCESSING APPARATUS FOR WARNING USER OF COLLISION WITH PHYSICAL OBJECT IN CROSS REALITY (XR) EXPERIENCE, INFORMATION PROCESSING METHOD, AND STORAGE MEDIUM

BACKGROUND

Technical Field

The present disclosure relates to an information processing apparatus for warning a user of a collision with a physical object in a cross reality (XR) experience, an information processing method, and a storage medium.

Description of the Related Art

Cross reality (XR) technology mixes a virtual world and a physical world in real time to create a new experience. Examples of an apparatus for presenting a video image using the XR include a head mounted display (HMD), a tablet computer, and a smartphone.

With the HMD, the user's field of view becomes narrower than that in daily life because there are a display region limit of a display device and a region that interrupts the video image of the physical world, such as a virtual image drawing region.

Further, a sense of immersion is required in the XR, and thus, when a user is having an XR experience using a tablet computer or a smartphone, the user sometimes becomes less careful about a physical object present around the user.

Thus, the risk of a user colliding with another user who is having the XR experience together with the user or the user colliding with a physical object present around the user may increase. For this reason, understanding danger associated with this situation is required.

Japanese Patent Application Laid-Open No. 2017-156887 discusses a technique of estimating a region where a user is present and providing a warning to the user in a case where another user or a physical object is present within a predetermined distance from the region.

Japanese Patent Application Laid-Open No. 2012-155654 discusses a technique for preventing the excessive warning. With this technique, a warning is not provided for a dangerous area or an object about which warnings have been provided more than a predetermined number of times. Further, the technique provides no warning in a case where the user is taking an action similar to that in a user's action history and provides no warning for a predesignated dangerous area or object.

SUMMARY OF THE INVENTION

The present disclosure is directed to a technique for appropriately making a user in a cross reality (XR) experience aware of a possibility of a collision with another user or a physical object present around the user.

According to an aspect of the present disclosure, an information processing apparatus includes at least one processor, and a memory coupled to the at least one processor and storing instructions that, when executed by the processor, cause the processor to function as a first acquisition unit configured to acquire information about a position and an orientation of a display apparatus, a second acquisition unit configured to acquire information about a position of a physical object, and a warning unit configured to change a warning method to warn a user depending on whether the physical object is present in a line-of-sight direction of the user.

Further features of the present disclosure will become apparent from the following description of exemplary embodiments with reference to the attached drawings.

BRIEF DESCRIPTION OF THE DRAWINGS

FIG. 5 is a flowchart illustrating an example of processing executed by the information processing apparatus.

DESCRIPTION OF THE EMBODIMENTS

Hereinbelow, exemplary embodiments of the present disclosure will be described with reference to the attached drawings. Configurations described in the following exemplary embodiments are representative examples, and the scope of the present disclosure is not necessarily limited to the specific configurations of the exemplary embodiments.

Figure 1:
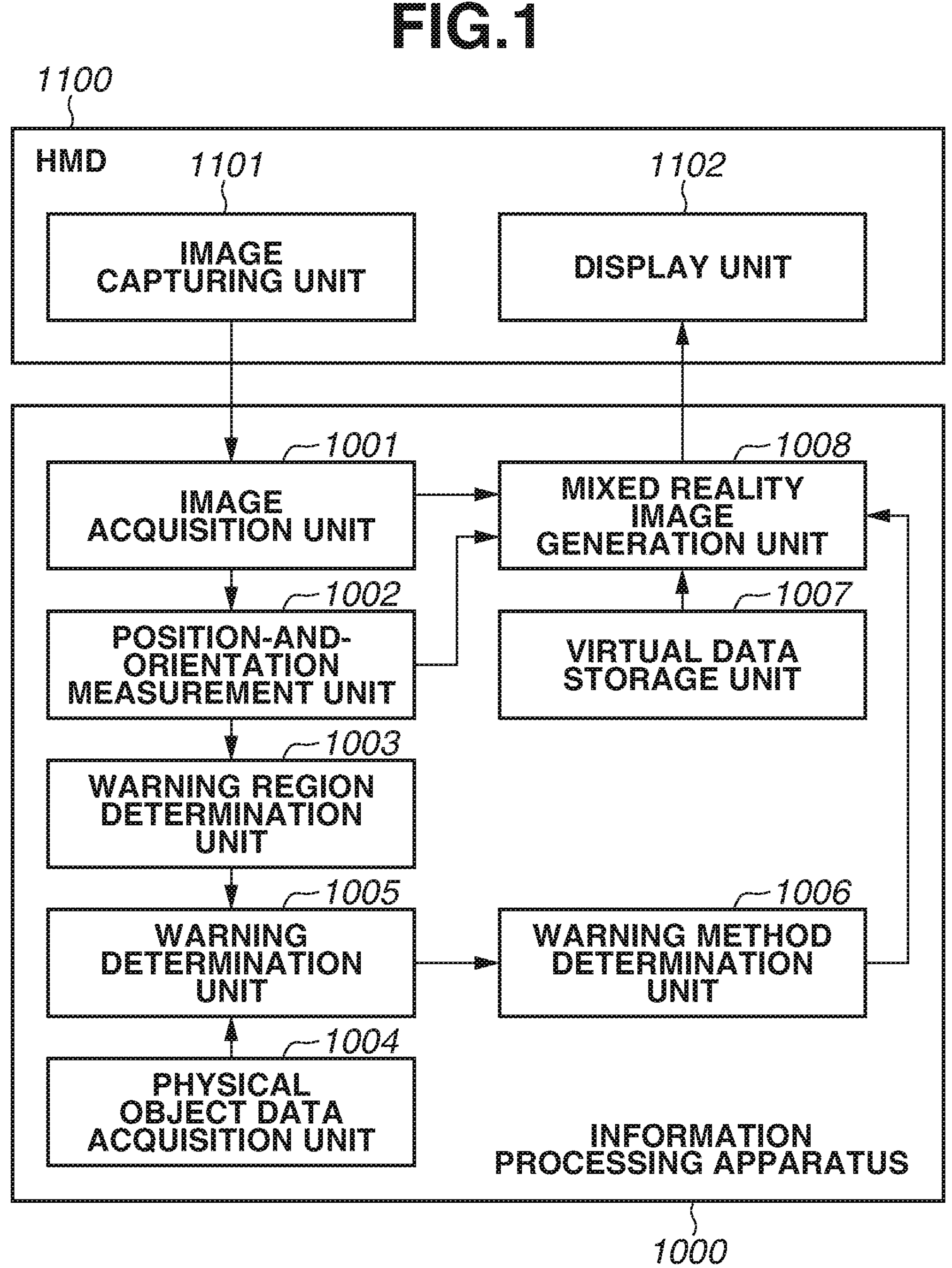
FIG. 1 is a block diagram illustrating an example of a system configuration.

FIG. 1 is a block diagram illustrating an example of a system configuration according to a first exemplary embodiment. As illustrated in FIG. 1, the system according to the present exemplary embodiment has a configuration in which an information processing apparatus 1000 is connected with a head mounted display (HMD) 1100 in a manner to be able to perform data communication. The connection may be a wired connection or a wireless connection.

Figure 2:
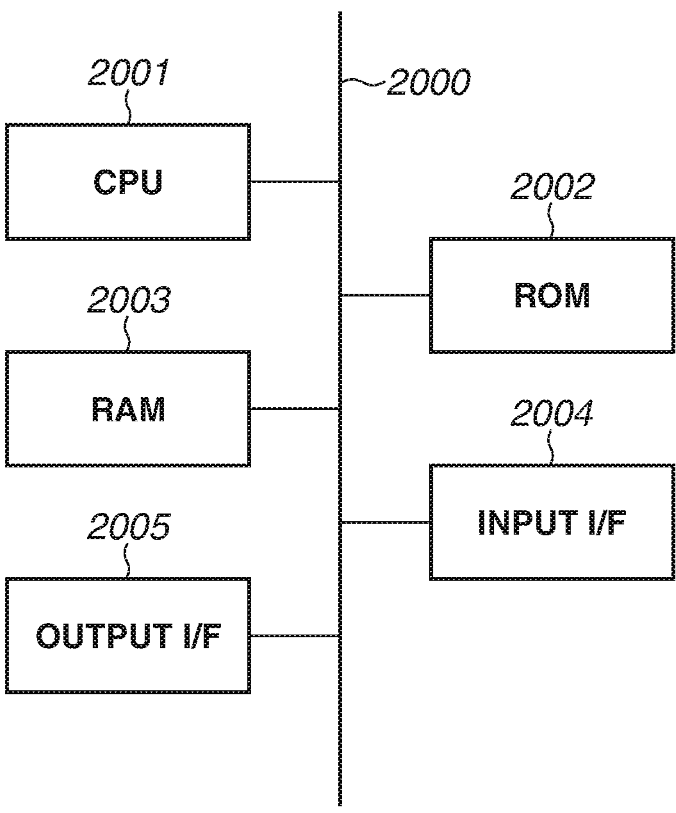
FIG. 2 is a block diagram illustrating an example of a hardware configuration of an information processing apparatus.

First, the information processing apparatus 1000 will be described. FIG. 2 is a block diagram illustrating a hardware configuration of the information processing apparatus 1000 according to the present exemplary embodiment. In FIG. 2, a central processing unit (CPU) 2001 comprehensively controls devices connected thereto via a bus 2000. The CPU 2001 reads and executes processing steps and programs stored in a read only memory (ROM) 2002. An operating system (OS), processing programs according to the present exemplary embodiment, and device drivers are stored in the ROM 2002, temporarily stored in a random access memory (RAM) 2003, and executed by the CPU 2001 as appropriate. Further, an input interface (I/F) 2004 receives, from an external apparatus (HMD 1100), an input signal in a format processable by the information processing apparatus 1000. Further, an output I/F 2005 outputs an output signal to the external apparatus (HMD 1100) in a format processable thereby.

An image acquisition unit 1001 acquires a real image captured by an image capturing unit 1101 of the HMD 1100, and inputs the acquired image to a position-and-orientation measurement unit 1002 and a mixed reality image generation unit 1008.

The position-and-orientation measurement unit 1002 measures a position and an orientation by performing image processing using the real image acquired by the image acquisition unit 1001 and extracting characteristic information (feature information), such as a point and a line, in the image. Information about the position and the orientation is input to a warning region determination unit 1003 and the mixed reality image generation unit 1008. In the present exemplary embodiment, position-and-orientation measurement using the image processing is described, but the position and orientation may be measured using infrared rays, ultrasonic waves, or a magnetic sensor. Further, the position and orientation may be measured using a depth sensor, or may be mechanically measured.

The warning region determination unit 1003 determines, as a warning region, a region having the position and orientation measured by the position-and-orientation measurement unit 1002 as the center and within a predetermined distance from the center. The warning region is divided into a region with a high possibility that a user can recognize a physical object and a region with a low possibility that the user can recognize a physical object. Specifically, the warning region determination unit 1003 calculates a view frustum of a display unit 1102 based on the position-and-orientation information measured by the position-and-orientation measurement unit 1002 and angle-of-view information about the display unit 1102 of the HMD 1100. The technique for calculating the view frustum is known, and a detailed description thereof is omitted. The view frustum is treated as a line-of-sight direction region. The warning region is divided into the line-of-sight direction region, which is a sub warning region in which the possibility that the user can recognize a physical object is high, and other regions, which is a main warning region in which the possibility that the user can recognize a physical object is low. The warning region determination unit 1003 inputs the determined warning regions in a warning determination unit 1005. In the present exemplary embodiment, as a method of determining the region in which the possibility that the user can recognize a physical object is high, the method of using the region that is being viewed by the user, i.e., the view frustum, has been described, but other methods may be used. In the case where the warning region determination unit 1003 obtains the line-of-sight direction region, the warning region determination unit 1003 may alternatively obtain a line-of-sight vector from the position-and-orientation information measured by the position-and-orientation measurement unit 1002 and determine a region formed of a cone or a rectangular pyramid with a predetermined size as the line-of-sight direction region. Further, a user may freely set the line-of-sight direction region depending on a situation in which the user is to have a cross reality (XR) experience. For example, in a case where a user is to have an XR experience in an environment with a wall on the back side of the user, since the user can recognize the wall on the back side, a backward region in the warning region may be set as the sub warning region in which the possibility that the user can recognize a physical object is high, and a forward region in the warning region may be set as the main warning region in which the possibility that the user can recognize a physical object is low.

A physical object data acquisition unit 1004 acquires at least a position of a physical object, which is a target of providing a warning to the user. The physical object data acquisition unit 1004 may acquire the position of the physical object and shape information thereon. When the physical object is another user, the physical object data acquisition unit 1004 acquires a position of the other user. The position of the other user may be acquired by receiving a position and orientation measured by an external personal computer (PC) (not illustrated) through a communication, or may be acquired by receiving a value measured by a sensor. Further, the physical object data acquisition unit 1004 may acquire the position and the shape information of the physical object using a result of scanning a physical space in advance by using a known three-dimensional reconstruction technique, or by making the user register the position and the shape information of the physical object in advance. Alternatively, the physical object data acquisition unit 1004 may acquire a physical object in real time by acquiring real images from a plurality of viewpoints to measure a depth of the physical object based on the parallax therebetween, and acquire the position and the shape information of the physical object. The physical object data acquisition unit 1004 inputs data on the acquired physical object to the warning determination unit 1005.

The warning determination unit 1005 determines whether to provide a warning based on the warning region acquired by the warning region determination unit 1003 and the position and the shape information in the physical object data acquired by the physical object data acquisition unit 1004. The warning determination unit 1005 performs the determination based on whether the physical object is present in the main warning region or the sub warning region. In a case where the warning determination unit 1005 determines to provide a warning, the warning determination unit 1005 provides a warning instruction to a warning method determination unit 1006.

The warning method determination unit 1006 determines a method for warning the user according to the instruction from the warning determination unit 1005. The warning method determination unit 1006 changes the warning method depending on whether the instruction from the warning determination unit 1005 is an instruction based on the presence of the physical object in the main warning region or based on the presence of the physical object in the sub warning region. At this time, the warning method based on the presence thereof in the main warning region is determined to be a warning method more noticeable than that based on the presence thereof in the sub warning region. In the present exemplary embodiment, a description is given of a warning method of displaying a warning mark on a screen of the display unit 1102 of the HMD 1100. The warning method determination unit 1006 determines the size and the position of the warning mark to be displayed based on whether the instruction is based on the presence of the physical object in the main warning region or that in the sub warning region. The warning method determination unit 1006 input data on the warning mark to the mixed reality image generation unit 1008.

Figure 3A:
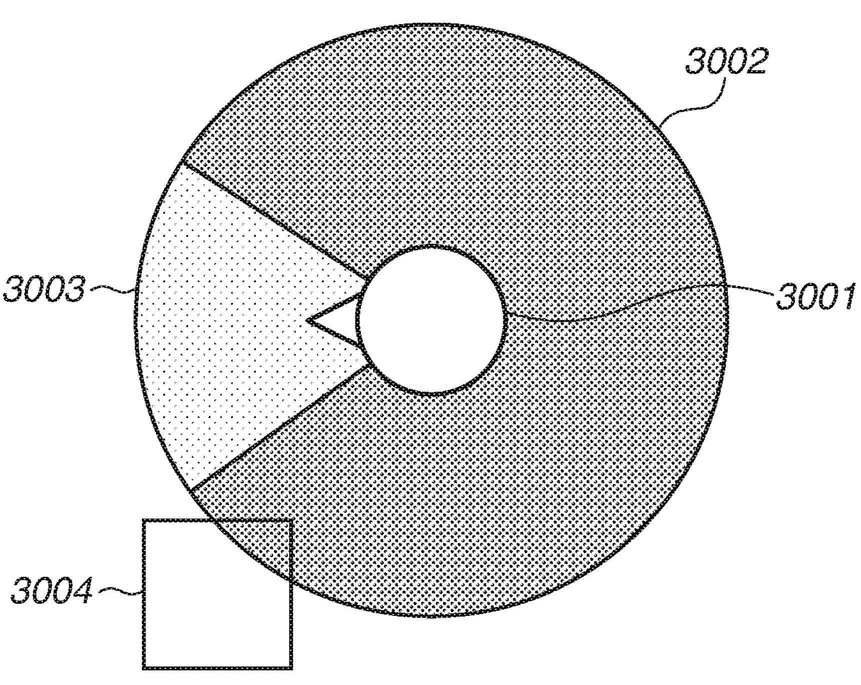
FIG. 3A is a diagram illustrating a positional relationship in a case where a physical object is present in a main warning region.
Figure 3B:
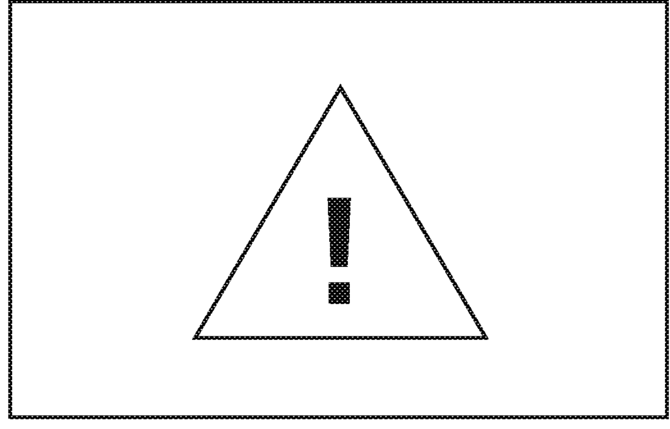
FIG. 3B is a diagram illustrating a warning screen in the case where the physical object is present in the main warning region.
Figure 4A:
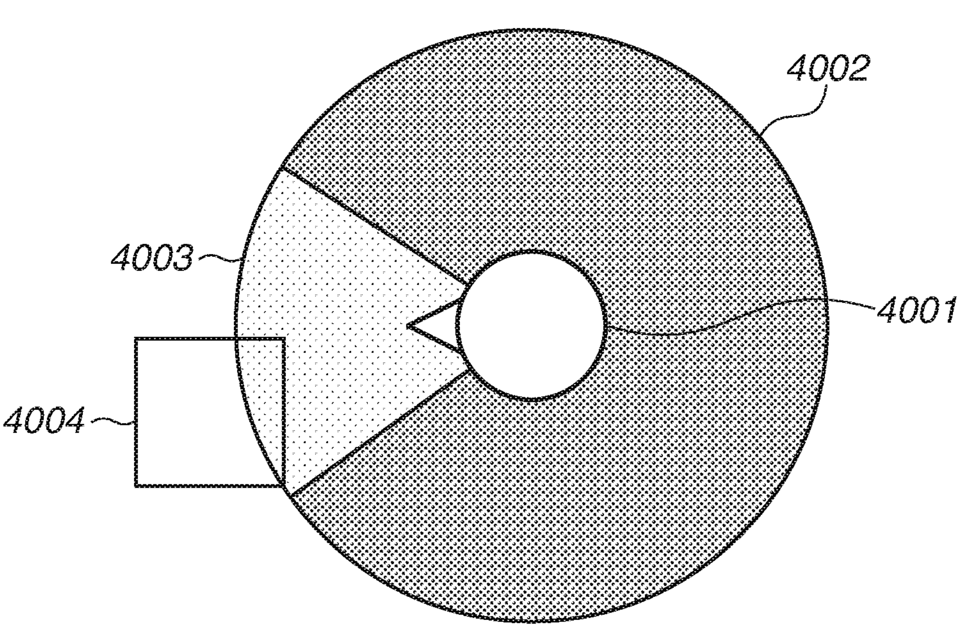
FIG. 4A is a diagram illustrating a positional relationship in a case where the physical object is present in a sub warning region.
Figure 4B:
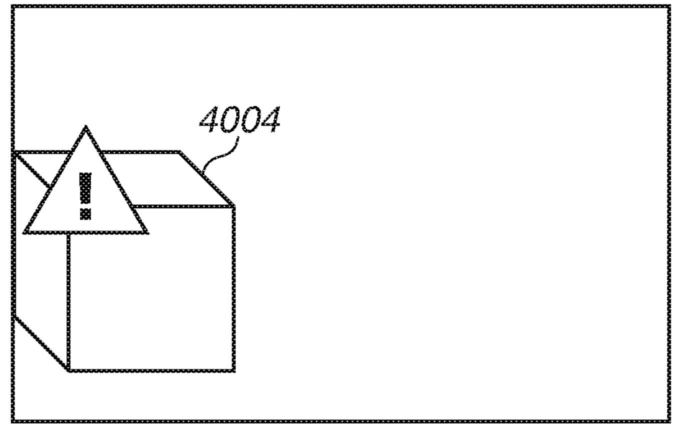
FIG. 4B is a diagram illustrating a warning screen in the case where the physical object is present in the sub warning region.

FIGS. 3A and 3B are diagrams illustrating a notification example in a case where a physical object to be a target of providing a warning to a user is present in the main warning region. FIG. 3A illustrates a positional relationship between a user 3001, and a main warning region 3002 and a sub warning region 3003 that are set based on a position and orientation of the user 3001 and a physical object 3004 to be the target of providing a warning. The line-of-sight direction region of the user 3001 is the sub warning region 3003, and the physical object 3004 is present in the main warning region 3002. FIG. 3B illustrates a warning method in this case. FIG. 3B illustrates a screen example displayed on the display unit 1102 of the HMD 1100. The warning mark is displayed in a manner so as to cover the screen so that the user can easily notice the warning mark. Next, FIGS. 4A and 4B illustrate a notification example in a case where a physical object to be a target of providing a warning to a user is present in the sub warning region. FIG. 4A illustrates a positional relationship between a user 4001, and a main warning region 4002 and a sub warning region 4003 that are set based on a position and orientation of the user 4001 and a physical object 4004 to be the target of providing a warning. The physical object 4004 is present in the sub warning region 4003. FIG. 4B illustrates a warning method in this case. FIG. 4B illustrates a screen example displayed on the display unit 1102 of the HMD 1100. To a position of the physical object 4004, a small warning mark providing a collision warning to the user is added. As described above, by changing the warning methods in the main warning region and the sub warning region, the warning for the physical object with a possibility of being recognized by the user is displayed in a restrained manner so as not to interrupt the sense of immersion.

In the present exemplary embodiment, while the same warning mark is used, the warning method is changed depending on whether the warning mark is displayed in a size and at a position to cover the screen of the display unit 1102 or the warning mark is displayed in a small size and at the position of the physical object, but the present disclosure is not limited thereto. In the case where the same warning mark is used, alternatively, the warning method may be changed, in a case where the physical object is present in the sub warning region, by displaying the same warning mark in a size not to cover the screen and at an edge of the screen. Further, in the case where the physical object is present in the sub warning region, the warning method may be changed by changing the expression of the notification between the main warning region and the sub warning region, for example, by displaying the physical object in a highlighted manner. Further, not limited to changing the display, sound or vibration may be used as the warning method. For example, in the case where the physical object is present in the main warning region, the sound may be made louder, and in the case where the physical object is present in the sub warning region, the sound may be made quieter. Alternatively, the warning method may be changed by changing high and low of the sound, a length of the sound, or the number of times of the sounds. Similarly, the warning method may be changed by changing a strength or a length of vibrations of an external apparatus (not illustrated) or the number of times of the vibrations.

A virtual data storage unit 1007 stores data related to a virtual space, such as data related to a virtual object constituting the virtual space (shape information or position-and-orientation information) and data related to a light source emitting light in the virtual space, and inputs the data to the mixed reality image generation unit 1008.

The mixed reality image generation unit 1008 generates a mixed reality image based on the measurement result of the position-and-orientation measurement unit 1002, the virtual space acquired from the virtual data storage unit 1007, the warning mark data acquired from the warning method determination unit 1006, and the real image acquired by the image acquisition unit 1001. The mixed reality image is generated by executing processing according to a flowchart described below. Then, the mixed reality image generation unit 1008 outputs the mixed reality image to the display unit 1102 of the HMD 1100 (display control). In the present exemplary embodiment, the example of displaying the mixed reality image on the HMD 1100 is described, but the present disclosure is not limited thereto. The mixed reality image may be displayed on a display terminal such as a tablet computer or a smartphone as long as the device can display an image.

These functional units are implemented by the CPU 2001 loading the program stored in the ROM 2002 into the RAM 2003 and executing the loaded program. For example, in a case where a hardware configuration is used instead of the software processing using the CPU 2001, calculation units and/or circuits corresponding to the functional units described above may be used.

Next, the HMD 1100 will be described.

The HMD 1100 includes the image capturing unit 1101 and the display unit 1102. The display unit 1102 is a display device including a liquid crystal screen or the like, and is provided to each of right and left eyes, and is attached to the HMD 1100 so that the display unit 1102 positions in front of each of the user's right and left eyes when the user mounted the HMD 1100 on the user's head. Further, on the right and left screens, stereo-images each with a parallax are displayed.

The image capturing unit 1101 captures an image of a physical space displayed on the HMD 1100, and inputs the captured image to the information processing apparatus 1000 as a real image.

The display unit 1102 displays the mixed reality image generated by the information processing apparatus 1000.

As described above, in the present exemplary embodiment, the HMD 1100 is described as a video see-through type HMD that displays, on the display unit 1102, the mixed reality image generated based on the images captured by the image capturing unit 1101. However, the present disclosure is not limited thereto. The HMD 1100 may be an optical see-through type HMD that superimposes a virtual space image on a display medium that enables observation of the physical space in a transmissive manner.

FIG. 5 is an example of a flowchart illustrating processing executed by the information processing apparatus 1000 to determine the main warning region and the sub warning region from the user's position-and-orientation information. Hereinbelow, S is added before a number indicating each step in describing the flowchart.

First, in step S5001, the position-and-orientation measurement unit 1002 acquires a real image from the image capturing unit 1101 and measures the position and orientation based on the image. Then, the processing proceeds to step S5002.

Figure 6A:
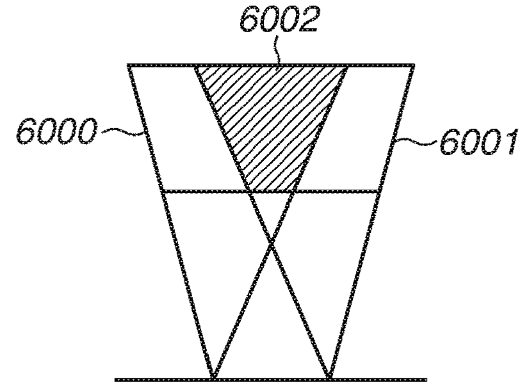
FIG. 6A is a diagram illustrating a determination method of the main warning region and the sub warning region.
Figure 6B:
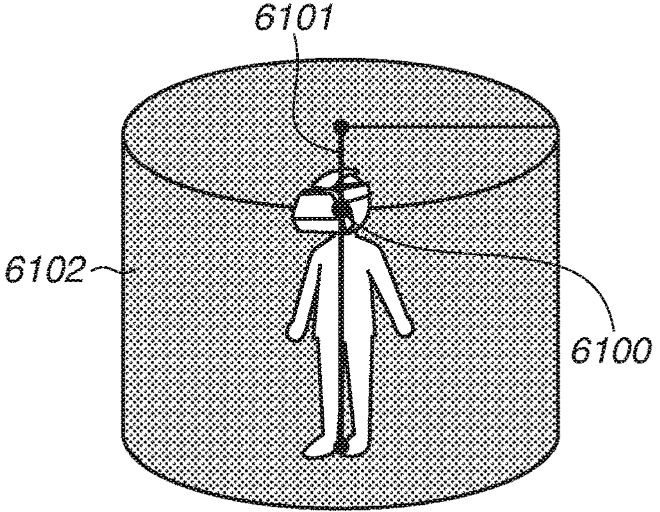
FIG. 6B is a diagram illustrating the determination method of the main warning region and the sub warning region.
Figure 6C:
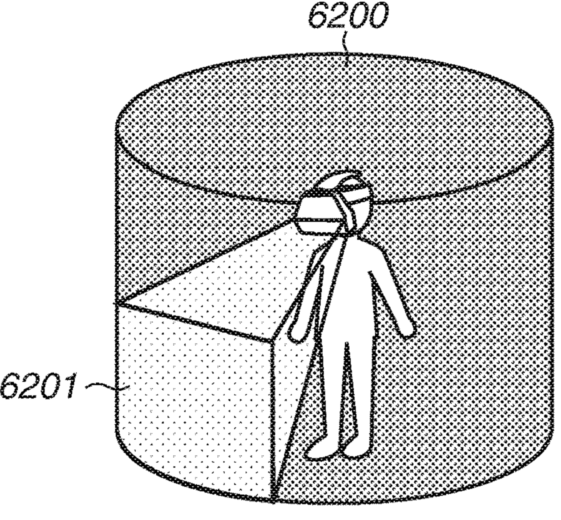
FIG. 6C is a diagram illustrating the determination method of the main warning region and the sub warning region.

The method of determining the warning region in steps S5002 to S5004 is described with reference to FIGS. 6A to 6C.

In step S5002, the warning region determination unit 1003 determines a warning region. Since the position-and-orientation measurement unit 1002 measures the position and orientation of the HMD 1100, the position-and-orientation measurement unit 1002 calculates a center position 6100 of the head based on the position and orientation. In the present exemplary embodiment, as illustrated in FIG. 6B, the warning region determination unit 1003 sets a cylindrical region 6102 having a vertical axis passing through the center position 6100 of the user's head as a center axis 6101 as the warning region. However, the present disclosure is not limited thereto. The warning region may be set using any other method as long as the warning region has enough room around the user to avoid a collision after the user receives the warning. As discussed in Japanese Patent Application Laid-Open No. 2017-156887, the user's posture may be estimated based on the position and orientation of the HMD 1100, and a region of the HMD wearing person determined based on the estimated user's posture may be set as the warning region.

In step S5003, the warning region determination unit 1003 determines a line-of-sight direction region extending from the position and orientation measured by the position-and-orientation measurement unit 1002. Based on the angle-of-view information about the display unit 1102 of the HMD 1100, as illustrated in FIG. 6A, the warning region determination unit 1003 calculates a view frustum 6000 of the left eye and a view frustum 6001 of the right eye. An overlapped region 6002 of the view frustum 6000 of the left eye and the view frustum 6001 of the right eye is determined as the line-of-sight direction region. Then, the processing proceeds to step S5004. In the present exemplary embodiment, the line-of-sight direction region is the overlapped region 6002 of the view frustum 6000 of the left eye and the view frustum 6001 of the right eye, but the line-of-sight direction region may a region including both the view frustum 6000 of the left eye and the view frustum 6001 of the right eye.

In step S5004, the warning region determination unit 1003 divides the warning region into the main warning region and the sub warning region. As illustrated in FIG. 6C, the warning region determination unit 1003 determines, as the sub warning region, an overlapped region 6201 of the line-of-sight direction regions in the warning region determined in step S5003. A region not overlapping the line-of-sight direction regions in the warning region is determined as the main warning region. Then, the processing proceeds to step S5005.

In step S5005, the warning determination unit 1005 determines whether a physical object around the user is present in the sub warning region based on the position and orientation of the physical object and the shape information thereon acquired by the physical object data acquisition unit 1004. In a case where the other user or the physical object is present in the sub warning region, the warning determination unit 1005 adds the corresponding physical object in a sub warning list. Then, the processing proceeds to step S5006.

In step S5006, the warning determination unit 1005 determines whether the physical object around the user is present in the main warning region based on the position and orientation and the shape information of the physical object acquired by the physical object data acquisition unit 1004. In a case where the other user or the physical object is present in the main warning region, the warning determination unit 1005 determines whether the corresponding physical object is included in the sub warning list. In a case where the other user or the physical object is not included in the sub warning list, the warning determination unit 1005 adds the corresponding physical object in a main warning list. In this way, the warning determination unit 1005 provides a warning that is based on the presence of the physical object in the sub warning region for the physical object present across the main warning region and the sub warning region.

Then, the processing proceeds to step S5007.

In step S5007, the warning determination unit 1005 determines whether the physical object is included in the main warning list. In a case where the physical object is included in the main warning list (YES in step S5007), the warning determination unit 1005 inputs, to the warning method determination unit 1006, a warning instruction that is based on the presence of the physical object in the main warning region, and the processing proceeds to step S5008. In a case where the physical object is not included in the main warning list (NO in step S5007), the processing proceeds to step S5010.

In step S5008, upon receiving the warning instruction, the warning method determination unit 1006 renders a warning mark. The warning method determination unit 1006 generates a warning image in which a warning mark is rendered at the center of the screen of the display unit 1102 and is a size that covers the screen. Then, the processing proceeds to step S5009.

In step S5009, the mixed reality image generation unit 1008 generates a virtual space from the data in the virtual data storage unit 1007. Further, the mixed reality image generation unit 1008 generates, as a virtual space image, the virtual space viewable from a predetermined position based on the position-and-orientation information acquired by the position-and-orientation measurement unit 1002. The technique for generating a virtual image is known, and a detailed description thereof is omitted. The mixed reality image generation unit 1008 generates a mixed reality image by superimposing the acquired virtual space image on the real image acquired by the image acquisition unit 1001. Then, the mixed reality image generation unit 1008 generates a mixed reality image for display by superimposing the warning image generated by the warning method determination unit 1006 on the mixed reality image. The mixed reality image generation unit 1008 provides the warning to the user by outputting the mixed reality image for display to the display unit 1102 of the HMD 1100.

In step S5010, the warning determination unit 1005 determines whether the physical object is included in the sub warning list.

In a case where the physical object is included in the sub warning list (YES in step S5010), the warning determination unit 1005 inputs, to the warning method determination unit 1006, a warning instruction that is based on the presence of the physical object in the sub warning region, and the processing proceeds to step S5011. In a case where the physical object is not included in the main warning list (NO in step S5010), the processing ends.

In step S5011, upon receiving the warning instruction, the warning method determination unit 1006 places the warning mark. The warning method determination unit 1006 generates the warning mark at a position where the sub warning region and the physical object held in the sub warning list are overlapped. The size of the warning mark at this time is smaller than that of the warning mark rendered in step S5006. Then, the processing proceeds to step S5012.

In the present exemplary embodiment, in the case where the physical object is included in the main warning list, the warning method determination unit 1006 provides only the warning that is based on the presence of the physical object in the main warning region, regardless of whether the physical object is included in the sub warning list. However, the present disclosure is not limited thereto. Both the warning based on the presence of the physical object in the main warning region and the warning based on the presence of the physical object in the sub warning region may be provided.

In step S5012, the mixed reality image generation unit 1008 generates a virtual space from the data in the virtual data storage unit 1007. Further, the mixed reality image generation unit 1008 arranges the warning mark generated by the warning method determination unit 1006 in the virtual space. The mixed reality image generation unit 1008 generates the virtual space image from the generated virtual space and the position-and-orientation information acquired from the position-and-orientation measurement unit 1002. The mixed reality image generation unit 1008 generates the mixed reality image by superimposing the virtual space image on the real image acquired by the image acquisition unit 1001, and provides the warning to the user by outputting the mixed reality image to the display unit 1102 of the HMD 1100.

According to the present exemplary embodiment, it is possible to weaken the degree of warning notification of the collision with the physical object located in the user's line-of-sight direction, i.e., the physical object recognizable by the user, and to provide the collision warning notification in a manner that enables the user to notice with certainty the physical object not recognizable by the user. In this way, it is possible to appropriately make a user having an XR experience aware of a possibility of a collision with another user or a physical object around the user, without interrupting the user's sense of immersion.

In the first exemplary embodiment, the warning determination unit 1005 inputs the warning instruction to the warning method determination unit 1006 in the case where the physical object is present in the sub warning region, but the warning notification may not necessarily be provided. In a first modification, the warning determination unit 1005 may determine that the warning is not required with regard to the physical object present in the user's line-of-sight direction region by determining that such a physical object is visible to the user, i.e., recognized by the user. In this case, the warning determination unit 1005 inputs the warning instruction only in the case where the physical object is present in the main warning region, and the processing in steps S5008 to S5010 is not executed.

In this way, it is possible to make a user aware of a possibility of a collision with only a physical object that the user has not recognized, without interrupting the user's sense of immersion.

In the first exemplary embodiment, the warning region is divided into two regions of the main warning region and the sub warning region, but the present disclosure is not limited thereto. The warning region may be divided into more than two regions.

Figure 7A:
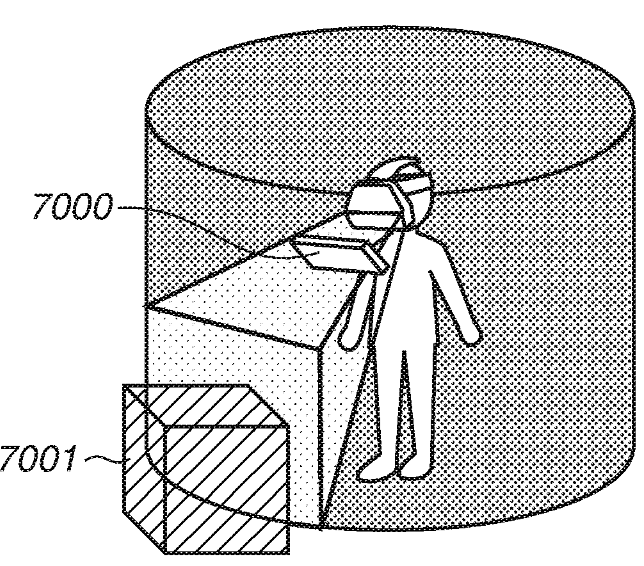
FIG. 7A is a diagram illustrating an example of a state where a physical object is masked by a virtual object.
Figure 7B:
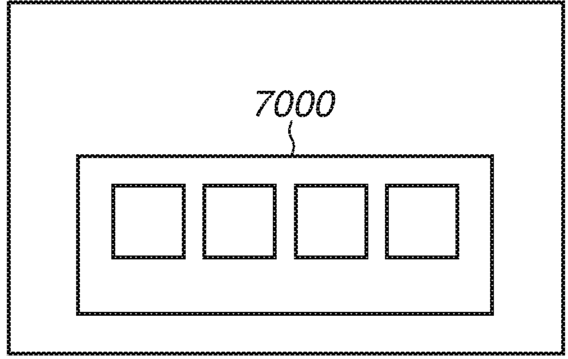
FIG. 7B is a diagram illustrating the example of the state where the physical object is masked by the virtual object.

As illustrated in FIG. 7A, in a case where a menu 7000 is rendered as a virtual object and displayed following the movement of the HMD 1100, there may be a case where the user's field of view is masked by the menu 7000, as illustrated in FIG. 7B, and the user cannot recognize a physical object 7001. A second modification is for such a case.

Figure 8:
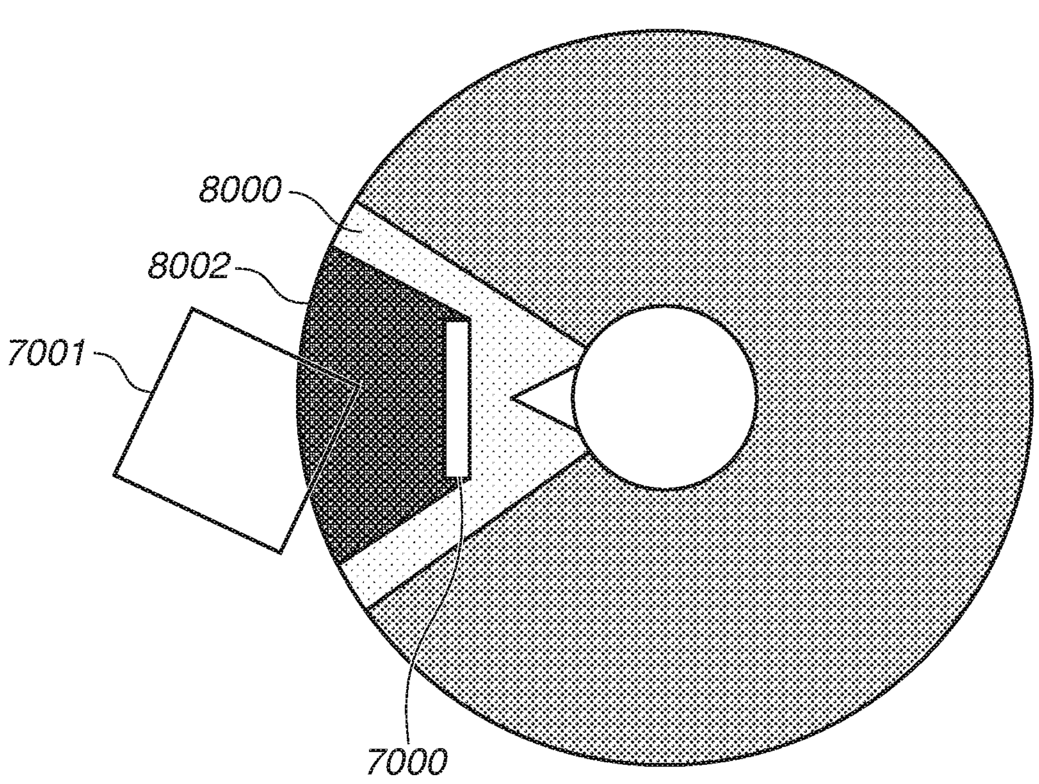
FIG. 8 is a diagram illustrating a division method of a warning region in a case where a field of view is masked by the virtual object.

First, similar to the first exemplary embodiment, the warning region determination unit 1003 divides the warning region into the main warning region and the sub warning region. Further, the warning region determination unit 1003 separates a region in which the user's field of view is masked by the virtual object from the sub warning region as a virtual object masking region based on the view frustum information as well as the position-and-orientation information and the shape information about the virtual object held in the virtual data storage unit 1007. FIG. 8 illustrates this state. FIG. 8 illustrates a divided state of the warning region in FIG. 7A viewed from above. The region in a line-of-sight direction region 8000, in which the field of view is masked by the menu 7000 (virtual object), is a virtual object masking region 8002.

The warning determination unit 1005 determines whether a physical object is present in the virtual object masking region, in addition to the main warning region and the sub warning region.

The warning method determination unit 1006 determines a warning method in a case where a physical object is present in the virtual object masking region in addition to determining the warning methods for the main warning region and the sub warning region. For example, in the case where a physical object is present in the virtual object masking region, the warning method determination unit 1006 adds a warning mark for providing a collision warning to the user at a position of the physical object, after displaying the virtual object masking the user's field of view in a semi-transparent manner.

In this way, it is possible to appropriately make a user aware of a possibility of a collision with another user or a physical object hidden behind a virtual object.

In the first exemplary embodiment, the example of weakening the degree of warning notification of the collision by determining the physical object present in the user's field of view as the physical object that the user can recognize, is described. However, in a case where a user is immersed in the XR experience, i.e., in a case where the user is concentrating on observation of a virtual object, the user sometimes may not notice a physical object in the user's field of view. A third modification is for such a case.

In the present modification, in the case where the user is concentrating on the observation of the virtual object, since the user tends to stay at a place, a movement amount of the user's position and orientation is considered to be small.

Figure 9:
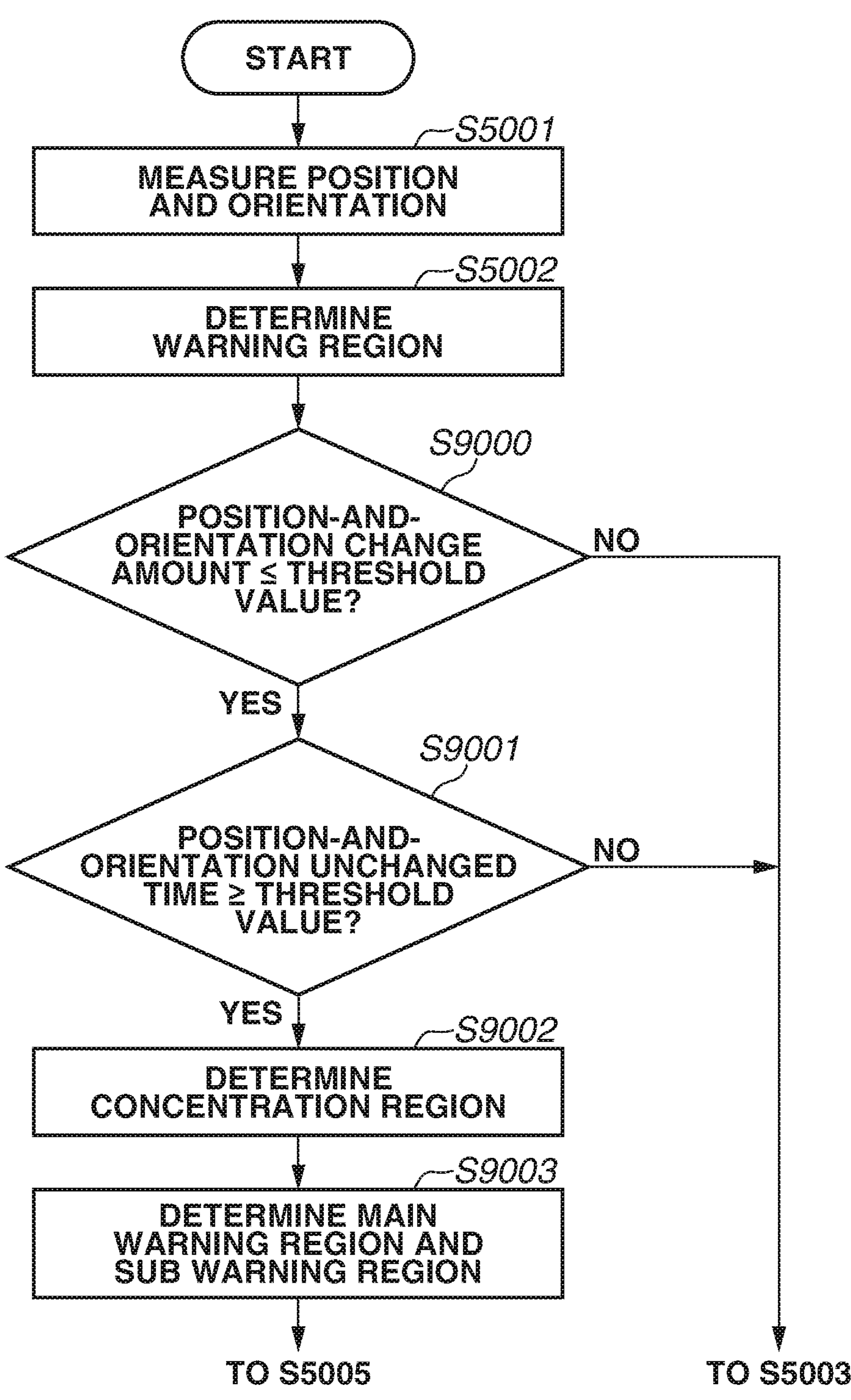
FIG. 9 is a flowchart illustrating an example of processing executed by an information processing apparatus.

FIG. 9 is a flowchart illustrating an example of changing processing of a warning region division method. The same steps as those in FIG. 5 are assigned the same reference numerals, and descriptions thereof are omitted.

In step S9000, the warning region determination unit 1003 determines whether an amount of change of the position and orientation of the position-and-orientation information acquired from the position-and-orientation measurement unit 1002 is a threshold value or less. For example, the warning region determination unit 1003 calculates a difference between a position and orientation obtained from a current frame and a position and orientation obtained from a frame immediately before the current frame, and determines whether the difference is the threshold value or less. In a case where the difference is the threshold value or less (YES in step S9000), a count value (initial value is 0) of a position-and-orientation unchanged time is counted up by one, and the processing proceeds to step S9001. In a case where the difference is more than the threshold value (NO in step S9000), the position-and-orientation unchanged time is set to 0, and the processing proceeds to step S5003.

In step S9001, the warning region determination unit 1003 determines whether the count value of the position-and-orientation unchanged time is a threshold value or more. In other words, the warning region determination unit 1003 determines whether the time during which the amount of change of the position and orientation is small has continued for a predetermined time or more to determine whether the user is concentrating. In a case where the position-and-orientation unchanged time is the threshold value or more (YES in step S9001), the processing proceeds to step S9002. In a case where the position-and-orientation unchanged time is less than the threshold value (NO in step S9001), the processing proceeds to step S5003.

In the present modification, the warning region determination unit 1003 determines whether the time during which the amount of change of the position and orientation is small continues for the predetermined time or more to determine whether the user is concentrating, but the present disclosure is not limited thereto. The warning region determination unit 1003 may determine that the user is concentrating in a case where a same virtual object continues to be present for a predetermined time or more in the line-of-sight direction of the user, or in a case where the user continues to be present in a predetermined working space.

In step S9002, the warning region determination unit 1003 determines a concentration region. The concentration region is defined based on an assumption that a user observes the center of the display unit 1102 of the HMD 1100 when concentrating.

First, the warning region determination unit 1003 calculates view frustums of the user's right and left eyes based on the angle-of-view information about the display unit 1102 of the HMD 1100, and calculates an overlapped region of the view frustums. The region within the angle of view of 30 degrees in both the vertical and horizontal directions with the center of the overlapped region as a starting point is defined as the concentration region. Then, the processing proceeds to step S9003. In the present modification, the concentration region is the region within the angle of view of 30 degrees with the center of the overlapped region of the view frustums as the starting point, but the present disclosure is not limited thereto. Any method may be used as long as the region that the user is concentrating on and observing can be determined. For example, the HMD 1100 may include a line-of-sight detection unit (not illustrated), and a region having the line-of-sight direction detected by the line-of-sight detection unit at the center of the region may be determined as the concentration region.

In step S9003, the warning region determination unit 1003 determines an overlapped region with the concentration region of the warning region as the sub warning region and regions other than that as the main warning region. Then, the processing proceeds to step S5005.

Processing in step S5005 and subsequent steps is the same as that of the first exemplary embodiment, and thus descriptions thereof are omitted.

In this way, it is possible to appropriately make a user aware of a possibility of a collision even in a case where the user is concentrating on a virtual object and it is difficult for the user to notice a physical object in the user's field of view.

OTHER EMBODIMENTS

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2023-047806, filed Mar. 24, 2023, which is hereby incorporated by reference herein in its entirety.

What is claimed is:

1. A head mounted display apparatus worn by a user comprising:

at least one sensor that senses objects in a predetermined region surrounding the user;

a display device that displays images visible to eyes of the user;

at least one memory storing instructions; and at least one processor that, upon execution of the instructions, causes the processor:

acquire information about a position and an orientation of the head mounted display apparatus, acquire, from the at least one sensor, information about a position of a physical object in real-space and within the predetermined region, divide the predetermined region surrounding the user into first region corresponding to a line of sight of the user wearing the head mounted display and a second region that is not in the line of sight of the user;

determine, based on the position information of the physical object acquired from the at least one sensor, whether the physical object is located in the first region or the second region;

set a warning method to warn a user regarding the physical object depending on whether the physical object is determined to be present in the first region or the second region;

display, on the display device, a mixed-reality image including a virtual environment and including a warning object generated in accordance with the set warning method, wherein when the physical object is determined to be in the second region, the warning object is superimposed in the mixed-reality image at or near a center of a display area of the display device and with a size larger than a size of the warning object in the case where the physical object is determined to be in the first region, and when the physical object is determined to be in the first region, the warning object is superimposed in the mixed-reality image in an area corresponding to the physical object.

2. The head mounted display apparatus according to claim 1, wherein execution of the instructions further causes the processor to display the warning object to warn the user in a case where the physical object is present in a region within a predetermined distance from the head mounted display apparatus.

3. The head mounted display apparatus according to claim 2, wherein execution of the stored instructions further causes the at least one processor to:

divide the region within the predetermined distance into a plurality of warning regions based on the information about the position and the orientation of the head mounted display apparatus, and determine whether the physical object is present in each of the plurality of warning regions, and wherein the warning method is changed to warn the user depending on which warning region of the plurality of warning regions the physical object is present.

4. The head mounted display apparatus according to claim 3, wherein execution of the instructions further causes the processor to divide the region within the predetermined distance into the plurality of warning regions based on information about a view frustum of the head mounted display apparatus.

5. The head mounted display apparatus according to claim 1, wherein execution of the instructions further causes the processor to display the warning object to warn the user, in a case where the physical object is not present in the line-of-sight direction of the user, using a warning method easier to be recognized by the user than a warning method used in a case where the physical object is present in the line-of-sight direction of the user.

6. The head mounted display apparatus according to claim 5, wherein execution of the instructions further causes the processor to display a first mark on the display device in the case where the physical object is not present in the line-of-sight direction, and displays a second mark smaller than the first mark on the head mounted display apparatus in the case where the physical object is present in the line-of-sight direction.

7. The head mounted display apparatus according to claim 5, wherein execution of the instructions further causes the processor to warn the user, in a case where the virtual object is present between the head mounted display apparatus and the physical object, using a warning method easier to be recognized by the user than a warning method used in a case where the virtual object is not present between the head mounted display apparatus and the physical object.

8. The head mounted display apparatus according to claim 7, wherein execution of the instructions further causes the processor to display a first mark on the display device of the head mounted display apparatus in the case where the virtual object is present between the head mounted display apparatus and the physical object, and displays a second mark smaller than the first mark on the display device of the head mounted display apparatus in the case where the virtual object is not present between the head mounted display apparatus and the physical object.

9. The head mounted display apparatus according to claim 1, wherein execution of the instructions further causes the processor to change the warning method to warn the user when a virtual object is present between the head mounted display apparatus device and the physical object and in a case where the physical object is present in the line-of-sight direction of the user.

10. The head mounted display apparatus according to claim 1, wherein execution of the instructions further causes the processor to warn the user using at least one of the display device on the head mounted display apparatus, a sound, and a vibration.

11. The head mounted display apparatus according to claim 1, wherein execution of the instructions further causes the processor to not warn the user in a case where the physical object is present in the line-of-sight direction of the user, and warn the user in a case where the physical object is not present in the line-of-sight direction of the user.

12. The head mounted display apparatus according to claim 1, wherein execution of the instructions further causes the processor to acquire information about an orientation of the physical object.

13. The head mounted display apparatus according to claim 1, wherein execution of the instructions further causes the processor to display acquire information about a shape of the physical object.

14. The head mounted display apparatus according to claim 1, wherein the first region is determined based on a view frustum of the display device determined based on the position and the orientation of the head mounted display apparatus and angle-of-view information of the display device.

15. The head mounted display apparatus according to claim 14, wherein the first region comprises an overlapped region of a left-eye view frustum and a right-eye view frustum.

16. The head mounted display apparatus according to claim 1, wherein, when a virtual object is present between the head mounted display apparatus and the physical object and the physical object is determined to be in the first region, the warning method includes causing the virtual object to be displayed semi-transparently and superimposing the warning object in an area corresponding to the physical object.

17. The head mounted display apparatus according to claim 1, wherein, when an amount of change of the position and the orientation of the head mounted display apparatus is less than or equal to a threshold value for at least a predetermined time, the first region is set to a concentration region.

18. The head mounted display apparatus according to claim 17, wherein the concentration region is within an angle of view of 30 degrees in both vertical and horizontal directions from a center of an overlapped region of view frustums of the user's left eye and right eye.

19. An information processing method executing on a head mounted display apparatus worn by a user and which includes at least one sensor that senses objects in a predetermined region surrounding the user and a display device that displays images visible to eyes of the user, the method comprising:

acquiring information about a position and an orientation of the head mounted display apparatus;

acquiring, from the at least one sensor, information about a position of a physical object in real space and within the predetermined region;

dividing the predetermined region surrounding the user into first region corresponding to a line of sight of the user wearing the head mounted display and a second region that is not in the line of sight of the user;

determining, based on the position information of the physical object acquired from the at least one sensor, whether the physical object is located in the first region or the second region;

setting a warning method to warn a user regarding the physical object depending on whether the physical object is determined to be present in the first region or the second region;

displaying, on the display device, a mixed-reality image including a virtual environment and including a warning object generated in accordance with the set warning method, wherein when the physical object is determined to be in the second region, the warning object is superimposed in the mixed-reality image at or near a center of a display area of the display device and with a size larger than a size of the warning object in the case where the physical object is determined to be in the first region, and when the physical object is determined to be in the first region, the warning object is superimposed in the mixed-reality image in an area corresponding to the physical object.

20. A non-transitory computer-readable storage medium storing a program that causes a computer of a head mounted display apparatus worn by a user and which includes at least one sensor that senses objects in a predetermined region surrounding the user and a display device that displays images visible to eyes of the user to execute an information processing method, the information processing method comprising:

acquiring information about a position and an orientation of a-the head mounted display apparatus;

acquiring, from the at least one sensor, information about a position of a physical object in real space and within the predetermined region;

dividing the predetermined region surrounding the user into first region corresponding to a line of sight of the user wearing the head mounted display and a second region that is not in the line of sight of the user;

determining, based on the position information of the physical object acquired from the at least one sensor, whether the physical object is located in the first region or the second region;

setting a warning method to warn a user regarding the physical object depending on whether the physical object is determined to be present in the first region or the second region;

displaying, on the display device, a mixed-reality image including a virtual environment and including a warning object generated in accordance with the set warning method, wherein when the physical object is determined to be in the second region, the warning object is superimposed in the mixed-reality image at or near a center of a display area of the display device and with a size larger than a size of the warning object in the case where the physical object is determined to be in the first region, and when the physical object is determined to be in the first region, the warning object is superimposed in the mixed-reality image in an area corresponding to the physical object.

* * * * *